(12) United States Patent
Jeong

(10) Patent No.: US 10,437,007 B2
(45) Date of Patent: Oct. 8, 2019

(54) CAMERA MODULE

(71) Applicant: LG Innotek Co., Ltd., Seoul (KR)

(72) Inventor: Youn Baek Jeong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 66 days.

(21) Appl. No.: 15/545,639

(22) PCT Filed: Jan. 11, 2016

(86) PCT No.: PCT/KR2016/000215
§ 371 (c)(1),
(2) Date: Jul. 21, 2017

(87) PCT Pub. No.: WO2016/117866
PCT Pub. Date: Jul. 28, 2016

(65) Prior Publication Data
US 2017/0363838 A1    Dec. 21, 2017

(30) Foreign Application Priority Data

Jan. 21, 2015  (KR) .................. 10-2015-0009754

(51) Int. Cl.
*G02B 7/09* (2006.01)
*G02B 26/00* (2006.01)
(Continued)

(52) U.S. Cl.
CPC .............. *G02B 7/09* (2013.01); *G02B 3/14* (2013.01); *G02B 7/08* (2013.01); *G02B 26/004* (2013.01);
(Continued)

(58) Field of Classification Search
CPC ... G02B 7/04; G02B 7/09; G02B 3/12; G02B 3/14; G02B 26/004; G02B 7/08;
(Continued)

(56) References Cited

U.S. PATENT DOCUMENTS

| 2012/0039590 A1 | 2/2012 | Jacobsen et al. | |
| 2014/0028905 A1* | 1/2014 | Kim | H04N 5/2257 348/374 |
| 2016/0088198 A1* | 3/2016 | An | H04N 5/2252 348/374 |

FOREIGN PATENT DOCUMENTS

| JP | 2013-122575 A | 6/2013 |
| KR | 10-2011-0127922 A | 11/2011 |

(Continued)

OTHER PUBLICATIONS

International Search Report in International Application No. PCT/KR2016/000215, filed Jan. 11, 2016.

*Primary Examiner* — Marin Pichler
(74) *Attorney, Agent, or Firm* — Saliwanchik, Lloyd & Eisenschenk

(57) ABSTRACT

One embodiment of a camera module can comprise: a housing having a first electrode pattern and a first recessed part, which are formed on the upper surface thereof; an auto-focusing unit mounted in the first recessed part and electrically connected to the first electrode pattern; a lens barrel accommodated inside the housing; a first holder which is disposed at the lower part of the housing and to which the lens barrel is coupled; and a printed circuit board disposed at the lower part of the first holder and electrically connected to the housing.

11 Claims, 11 Drawing Sheets

(51) Int. Cl.
  *G02B 3/14* (2006.01)
  *G03B 3/10* (2006.01)
  *G03B 13/36* (2006.01)
  *G03B 29/00* (2006.01)
  *G02B 7/08* (2006.01)
  *G02B 26/08* (2006.01)
(52) U.S. Cl.
  CPC ............ *G02B 26/0841* (2013.01); *G03B 3/10* (2013.01); *G03B 13/36* (2013.01); *G03B 29/00* (2013.01)
(58) Field of Classification Search
  CPC ........ G02B 3/10; G02B 26/0841; G03B 3/10; G03B 13/32; G03B 13/34; G03B 13/36; G03B 29/00
  USPC ................ 359/665–667, 554–555, 557, 698
  See application file for complete search history.

(56) References Cited

FOREIGN PATENT DOCUMENTS

KR  10-2013-0124673 A  11/2013
KR  10-2014-0012814 A  2/2014

\* cited by examiner

CAMERA MODULE

CROSS-REFERENCE TO RELATED APPLICATIONS

This application is the U.S. national stage application of International Patent Application No. PCT/KR2016/000215, filed Jan. 11, 2016, which claims priority to Korean Application No. 10-2015-0009754, filed Jan. 21, 2015, the disclosures of each which are incorporated herein by reference in their entirety.

TECHNICAL FIELD

Embodiments relate to a camera module.

BACKGROUND ART

In this section, the following description merely provides information regarding the background of the embodiments, and does not constitute the conventional art.

In recent years, information technology (IT) products equipped with miniature digital cameras, such as mobile phones, smartphones, tablet PCs, and laptop computers, have been actively developed.

Accordingly, camera modules for realizing such miniature digital cameras have been miniaturized. As the camera modules are miniaturized, however, the parts constituting each camera module must be miniaturized.

In general, the assembly of small-sized parts is difficult, and small-sized parts tend to have poor resistance to external impacts. Therefore, parts constituting a miniaturized camera module may have such a tendency.

Particularly, the respective parts of the camera module may be connected to each other in order to perform auto focusing. If electric conduction members for connecting the respective parts of the camera module are damaged or broken due to external impacts, the camera module may not perform various functions, including auto focusing.

In addition, it may be difficult to assemble the miniaturized parts of the camera module. Consequently, there is a necessity to reduce the number of parts constituting the camera module.

DISCLOSURE

Technical Problem

Embodiments provide a camera module having a solid structure that is capable of reducing damage or breakage due to impacts and a structure whereby the number of parts constituting the camera module is reduced.

It should be noted that the objects of the disclosure are not limited to the objects mentioned above, and other unmentioned objects of the disclosure will be clearly understood by those skilled in the art to which the disclosure pertains from the following description.

Technical Solution

In one embodiment, a camera module may include a housing having a first electrode pattern formed on the upper surface thereof and a first recess formed in the upper surface thereof, an auto-focusing unit mounted in the first recess and connected to the first electrode pattern, a lens barrel received in the housing, a first holder disposed at the lower portion of the housing, the lens barrel being coupled to the first holder, and a printed circuit board disposed at the lower portion of the first holder and connected to the housing.

The housing may be provided on at least one selected from between the outer surface and the inner surface thereof with a second electrode pattern for connecting the first electrode pattern to the printed circuit board.

The housing may be provided with a first protrusion protruding downward from the lower portion thereof and having an end coupled to the upper surface of the printed circuit board, a portion of the second electrode pattern being formed on the surface of the first protrusion.

The second electrode pattern may include a plurality of second electrode patterns, and the first protrusion may include a plurality of first protrusions in the same number as the second electrode patterns.

The first protrusion may be formed at a corner of the housing, and the first holder may be provided at a corner thereof opposite the corner of the housing with a first avoidance portion for avoiding interference with the first protrusion.

The first avoidance portion may be formed by chamfering the corner of the first holder opposite the corner of the housing.

The first electrode pattern or the second electrode pattern may be formed on the housing using a molded interconnected device (MID) method or a laser direct structuring (LDS) method.

The auto-focusing unit may include a lens unit formed of a flexible film having therein a transparent fluid and a film-shaped adjustment unit made of a piezo material, the adjustment unit being disposed at at least one selected from between the upper side and the lower side of the lens unit to deform the shape of the lens unit such that the lens unit performs auto focusing.

The first recess may have a pad unit disposed at the bottom surface thereof, the pad unit forming an end of the first electrode pattern and being connected to the auto-focusing unit.

The first recess may be quadrangular when viewed in a first direction, and may be provided in a corner thereof with a second recess, which communicates with the first recess, or in each side thereof with a third recess, which communicates with the first recess.

In another embodiment, a camera module may include a cover member, a housing disposed at the lower side of the cover member, the housing having a first electrode pattern formed on the upper surface thereof, an auto-focusing unit disposed at the upper surface of the housing and connected to the first electrode pattern, a lens barrel received in the housing, a first holder disposed at the lower portion of the housing, the lens barrel being coupled to the first holder, and a printed circuit board disposed at the lower portion of the holder and connected to the housing.

The cover member may be provided in the central portion thereof with a hollow portion and in the lower surface thereof with a recessed first receiving portion for receiving the auto-focusing unit.

The upper surface of the first receiving portion and the upper surface of the auto-focusing unit may be spaced apart from each other.

The distance between the upper surface of the first receiving portion and the upper surface of the auto-focusing unit may be 20 μm to 50 μm.

In a further embodiment, a camera module may include a cover member, a housing disposed at the lower side of the cover member, the housing having a first electrode pattern formed on the upper surface thereof, an auto-focusing unit disposed at the upper surface of the housing and connected to the first electrode pattern, a lens barrel received in the housing, a first holder disposed at the lower portion of the housing, the lens barrel being coupled to the first holder, a filter coupled to the lower side of the first holder, a printed circuit board disposed at the lower portion of the first holder and connected to the housing, the printed circuit board having an image sensor mounted on a position thereof opposite the filter, and a second electrode pattern formed at the edge of the housing for connecting the first electrode pattern to the printed circuit board.

Advantageous Effects

In embodiments, the electrode pattern is formed on the housing in order to connect the auto-focusing unit to the printed circuit board, and no additional part for electric conduction is used, whereby the structure of the camera module may be simplified and the number of parts of the camera module may be reduced.

In addition, since no additional part for electric conduction is used, a greater number of steps of the process of assembling the camera module may be performed through automation.

In addition, since no additional part for electric conduction is used, the camera module may have a solid structure. When impact tests are performed on the camera module, therefore, it is possible to reduce the faulty operation rate of the camera module due to damage to the camera module.

BEST MODE

Figure 1:
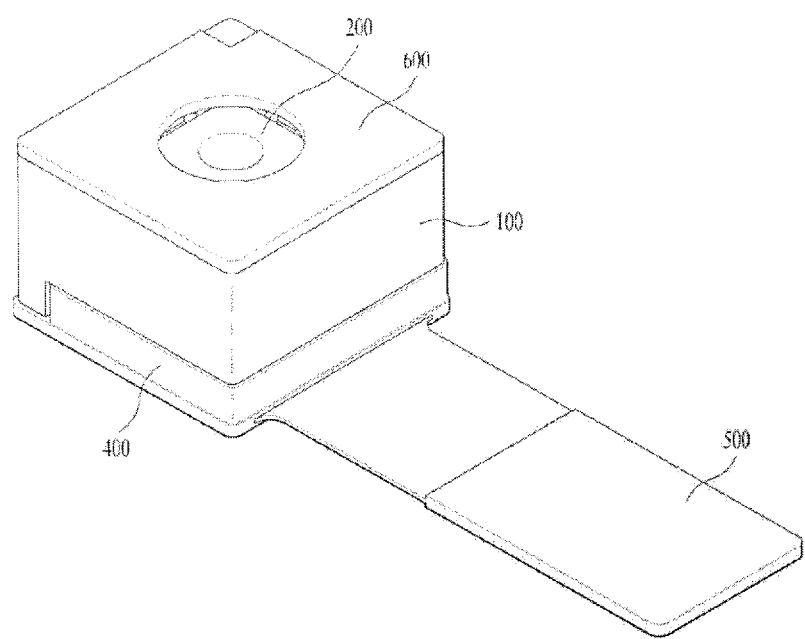
FIG. 1 is a perspective view showing a camera module according to an embodiment.

Reference will now be made in detail to the preferred embodiments, examples of which are illustrated in the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is intended to cover all modifications, equivalents, and alternatives falling within the spirit and scope of the embodiments. In the drawings, the sizes and shapes of elements may be exaggerated for convenience and clarity of description.

It may be understood that, although the terms "first," "second," etc. may be used herein to describe various elements, these elements should not be limited by these terms. These terms are generally only used to distinguish one element from another. In addition, terms particularly defined in consideration of construction and operation of the embodiments are used only to describe the embodiments, but do not define the scope of the embodiments.

In the description of embodiments, it will be understood that when an element is referred to as being "on" or "under" another element, it can be directly on/under the element, and one or more intervening elements may also be present. When an element is referred to as being "on" or "under," "under the element" as well as "on the element" can be included based on the element.

In addition, relational terms, such as "on/upper portion/above" and "under/lower portion/below," are used only to distinguish between one subject or element and another subject and element without necessarily requiring or involving any physical or logical relationship or sequence between such subjects or elements.

Furthermore, in the drawings, a rectangular coordinate system (x, y, z) may be used. In the drawings, the x-axis and the y-axis are axes perpendicular to an optical axis. For the sake of convenience, an optical axis (z-axis) direction may be referred to as a first direction, an x-axis direction may be referred to as a second direction, and a y-axis direction may be referred to as a third direction.

Figure 2:
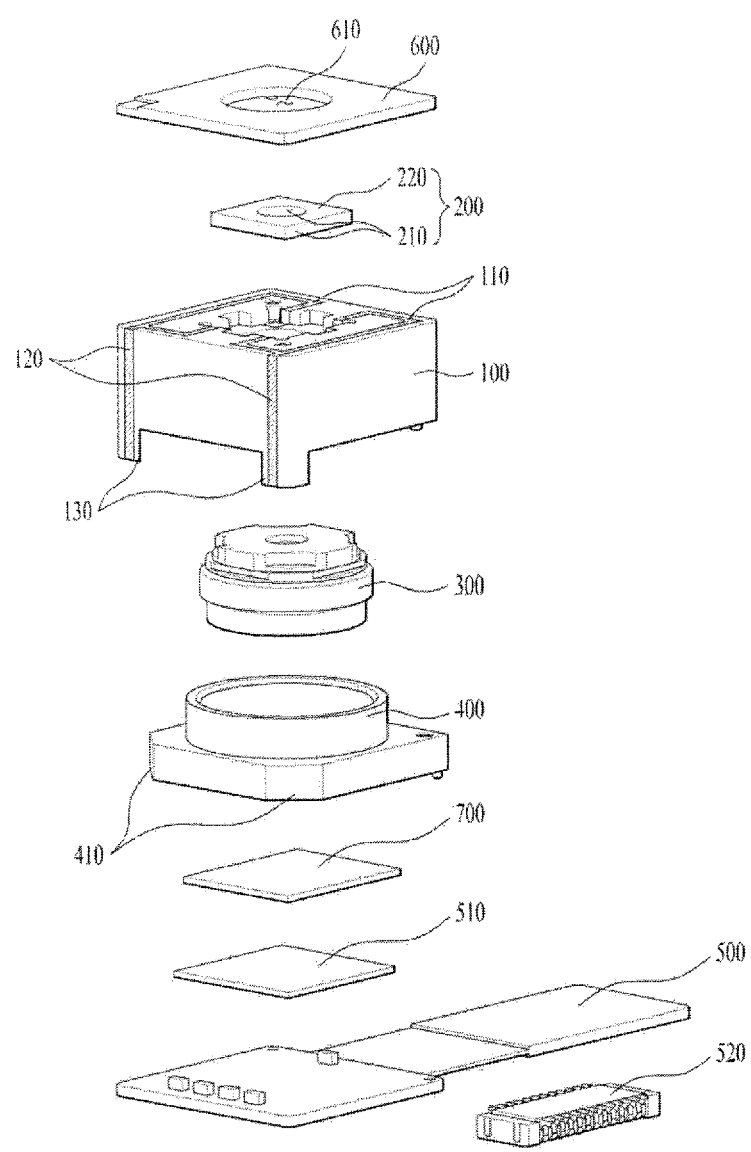
FIG. 2 is an exploded perspective view showing the camera module according to the embodiment.

FIG. 1 is a perspective view showing a camera module according to an embodiment. FIG. 2 is an exploded perspective view showing the camera module according to the embodiment. The camera module according to the embodiment may include a housing 100, an auto-focusing unit 200, a lens barrel 300, a first holder 400, a printed circuit board 500, a cover member 600, and a filter 700.

The housing 100 may have therein a space for receiving a lens module. A first electrode pattern 110 and a second electrode pattern 120, a conductive pattern, a surface electrode, a surface circuit, a surface electrode pattern, or a plated wire pattern may be formed on the surface of the housing 100. In addition, the auto-focusing unit 200 may be disposed at the upper surface of the housing 100. To this end, a first recess 140 may be formed in the upper surface of the housing 100.

The first electrode pattern 110 may be formed on the upper surface of the housing 100. One end of the first electrode pattern 110 may be connected to the auto-focusing unit 200, which is disposed at the upper surface of the housing 100. The other end of the first electrode pattern 110 may be connected to the second electrode pattern 120, which is formed at the edge of the housing 100.

Meanwhile, one end of the second electrode pattern 120 may be connected to the printed circuit board 500. Consequently, the auto-focusing unit 200 may be connected to the printed circuit board 500 via the first electrode pattern 110 and the second electrode pattern 120 so as to be operated by current supplied from the printed circuit board 500.

Meanwhile, a plurality of second electrode patterns 120 may be provided at the housing 100. The first electrode pattern 110 and the second electrode pattern 120, which are formed at the housing 100, will be described below in detail.

The auto-focusing unit 200 may be disposed at the upper surface of the housing 100, and may be connected to the first electrode pattern 110. In addition, the auto-focusing unit 200 may perform an auto-focusing function of automatically adjusting the focal distance to a subject in the optical-axis direction, i.e. the first direction. In order to perform auto focusing, the auto-focusing unit 200 may include a lens unit 210 and an adjustment unit 220.

Figure 5:
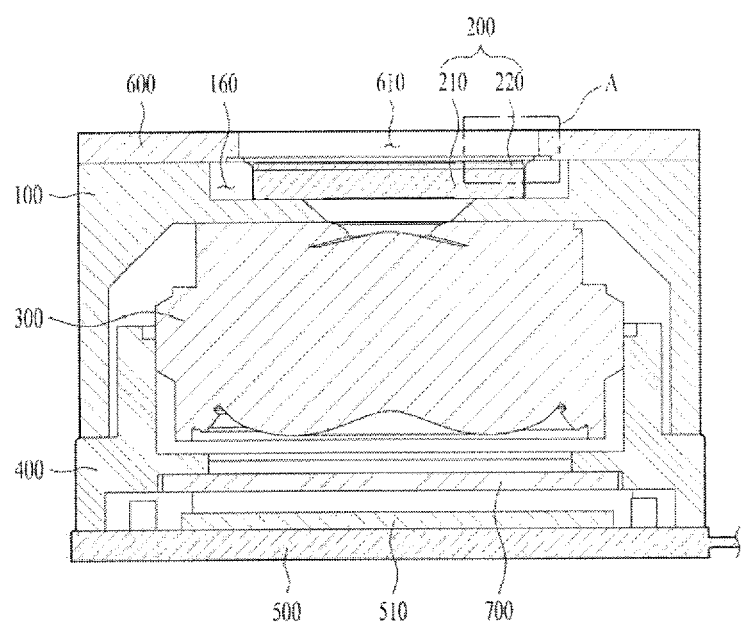
FIG. 5 is a sectional view showing the camera module according to the embodiment.

The lens unit 210 may be formed of a flexible film having therein a transparent fluid. In order to prevent damage to the lens unit 210, however, the lens unit 210 may be received in a solid case, as shown in FIGS. 2 and 5.

In the lens unit 210, the flexible film may be deformed, with the result that the overall shape of the lens unit or the curvature of a region of the flexible film on which light is incident may be changed. Auto focusing may be performed based on the shape or curvature change.

The adjustment unit 220 may deform the shape of the lens unit 210 such that the lens unit 210 performs auto focusing. For example, the adjustment unit 220 may be deformed by current supplied from the printed circuit board 500 to push the lens unit 210 such that the lens unit 210 performs auto focusing.

As described above, the auto-focusing unit 200 may be connected to the printed circuit board 500 via the first electrode pattern 110 and the second electrode pattern 120.

When current from an external power source is supplied to the printed circuit board 500, the current may be supplied to the adjustment unit 220 of the auto-focusing unit 200. The adjustment unit 220 may be deformed by the current and may thus the lens unit 210.

The adjustment unit 220 may be formed, for example, in a film shape, and may be made of a piezo material. In the case in which the adjustment unit 220 is formed in a film shape, the shape of the adjustment unit 220 may be easily changed in order to easily adjust the shape or curvature of the lens unit 210.

The piezo material may be also be called a piezoelectric material. When the piezo material is deformed by external force, current flows in the piezo material. When current is supplied to the piezo material, on the other hand, the piezo material may be deformed.

This effect is a piezoelectric effect. The adjustment unit 220 may be deformed by the piezoelectric effect and may thus push the lens unit 210. As a result, the shape or curvature of the lens unit 210 may be changed, whereby the lens unit 210 may perform auto focusing.

In an embodiment, as shown in FIG. 2, the film-shaped adjustment unit 220 may be disposed at the upper side of the lens unit 210. Specifically, the adjustment unit 220 may be bonded to the upper surface of the lens unit 210, and may be provided in the central portion thereof with a space, through which light may be incident on the lens unit 210.

In another embodiment, although not shown, the film-shaped adjustment unit 220 may be disposed at the lower side of the lens unit 210. In the same manner, the adjustment unit 220 may be bonded to the lower surface of the lens unit 210, and may be provided in the central portion thereof with a space, through which light may be incident on the lens unit 210.

The lens barrel 300 may be received in the housing 100 such that light is incident to the lens barrel 300 through the lens unit 210. At least one lens may be mounted in the lens barrel 300. After passing through the lens barrel 300, the light may pass through the filter 700 and may then be incident on an image sensor 510, which is disposed so as to be opposite the filter 700.

The lens barrel 300 may be coupled to the first holder 400 and the first holder 400 may be coupled to the housing 100 such that the lens barrel 300 is received in the housing 200 and the front of the lens barrel 300 is opposite the lens unit 210.

The first holder 400 may be disposed at the lower portion of the housing 100, and the lens barrel 300 may be coupled to the first holder 400. The first holder 40 may be provided in the central portion thereof with a space, in which the lens barrel 300 is coupled. In this case, the lens barrel 300 may be coupled to the first holder 400 through the upper portion or the lower portion thereof.

In another embodiment, the first holder and the housing may be formed integrally, and the lens barrel 300 may be coupled to the lower portion of an element constituted by the first holder and the housing.

Additionally, in an embodiment, as shown in FIG. 2, a ring-shaped protruding portion having an inner circumferential surface, to which the lens barrel 300 is coupled, may be provided.

Meanwhile, the lens barrel 300 may be coupled to the first holder 400 in various manners. For example, a female thread may be formed in the inner circumferential surface of the first holder 400 and a male thread corresponding to the female thread may be formed in the outer circumferential surface of the lens barrel 300 such that the lens barrel 300 is coupled to the first holder 400 by engagement therebetween.

However, the disclosure is not limited thereto. No thread may be formed in the inner circumferential surface of the first holder 400, and the lens barrel 300 may be directly fixed to the first holder 400 using a method other than threaded engagement. That is, the lens barrel 300 may be coupled to the first holder 400 using an adhesive or by interference fitting or shape fitting.

Meanwhile, in another embodiment, one or more lenses may be integrally formed with the first holder 400 to constitute an optical system without the lens barrel 300.

Meanwhile, one lens may be coupled to the lens barrel 300. Alternatively, two or more lenses may be provided to constitute an optical system.

The filter 700 may be coupled to or disposed at the lower portion of the first holder 400, and the lower end of the first holder 400 may be coupled to the printed circuit board 500. In addition, the first holder 400 may be quadrangular when viewed in the first direction.

The first holder 400 may be provided at corners thereof opposite corners of the housing 100 with first avoidance portions 410 for avoiding interference with first protrusions 130. That is, the housing 100 may be provided with first protrusions 130 protruding downward from the lower portion thereof and having ends coupled to the upper surface of the printed circuit board 500.

The housing 100 may be quadrangular when viewed in the first direction. The first protrusions 130 may be formed at the corners of the housing 100. In order to avoid interference between the first protrusions 130 and the first holder 400, therefore, the first avoidance portions 410 may be formed at the corners of the first holder 400.

As shown in FIG. 2, for example, the first avoidance portions 410 may be formed by chamfering the corners of the first holder 400 opposite the corners of the housing 100. In addition, the number of first avoidance portions 410 may correspond to the number of corners of the first holder 400.

The printed circuit board 500 may be disposed at the lower portion of the first holder 400 and may be connected to the housing 100. As described above, current from the external power source may be supplied to the printed circuit board 500.

In addition, the printed circuit board 500 may be connected to the housing 100 via the first electrode pattern 110 and the second electrode pattern 120. Consequently, current from the external power source may be supplied to the housing 100 and the auto-focusing unit 200, which is connected to the housing 100, via the printed circuit board 500.

The printed circuit board 500 may be disposed at the lower portion of the housing 100 or the first holder 400. The image sensor 510 may be mounted on the printed circuit board 500. The printed circuit board 500 may be provided with a connector 520.

The image sensor 510 may be mounted on a position opposite the filter 700. The image sensor 510 is a region on which the light that has passed through the filter 700 is incident to form an image included in the light.

The image sensor 510 may be placed in an x-y plane, which is perpendicular to the first direction. In an embodiment, the image sensor 510 may be mounted on the upper surface of the printed circuit board 500.

Meanwhile, the printed circuit board 500 may be provided with various circuits, devices, a controller, etc. in order to convert an image formed on the image sensor 510 into an electrical signal and to transmit the electrical signal to an external device.

The connector 520 may be coupled to the printed circuit board 500, or may connect the printed circuit board 500 and the external apparatus to each other. The external apparatus may be, for example, an external power source, a storage device, or a display device. A plurality of devices may be simultaneously connected to the printed circuit board 500.

Consequently, the connector 520 may be provided with a plurality of terminals for simultaneously connecting the external power source, the storage device, and the display device to the printed circuit board 500.

The filter 700 may be coupled to, for example, the lower side of the first holder 500 so as to be mounted on the first holder 400. The filter 700 may prevent a specific wavelength component of the light passing through the lens barrel 300 from being incident on the image sensor 510. The filter 700 may be placed in the x-y plane.

Additionally, in an embodiment, the filter 700 may be an infrared cutoff filter, an infrared absorption filter, or a blue filter. In addition, the region of the first holder 400 on which the filter 700 is mounted may be provided with a space, through which light passing through the filter 700 is incident on the image sensor 510.

The space may be a space through which the image sensor 510, which is coupled to the printed circuit board 500, is disposed in the first holder 400.

The cover member 600 may be disposed at the upper side of the housing 100, and may be provided in the central portion thereof with a hollow portion 610 on which light is incident. In addition, the cover member 600 may be provided in the lower surface thereof with a recessed first receiving portion 620 for receiving the auto-focusing unit 200.

In addition, if the cover member 600 can be disposed so as to be spaced apart from the auto-focusing unit 200 without the first receiving portion 620, the cover member 600 may be flat, rather than recessed. The structure of the cover member 600 will be described below in detail.

Figure 3:
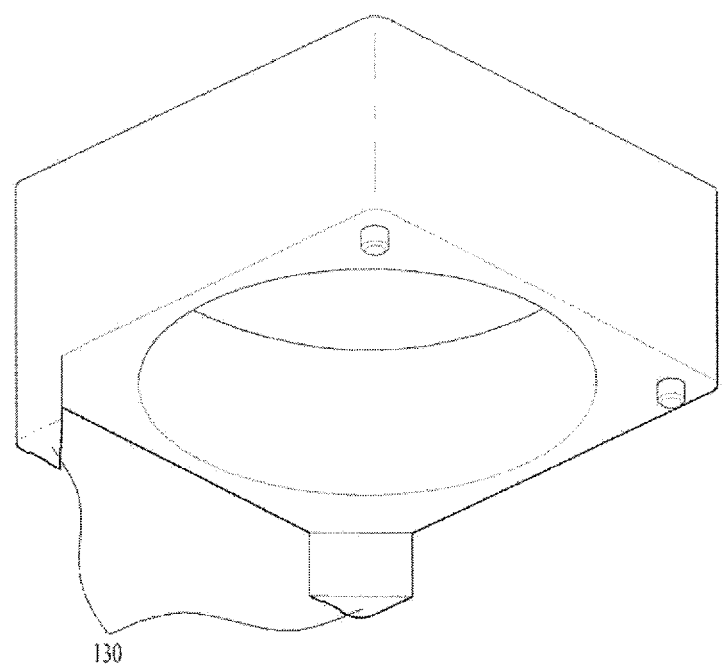
FIG. 3 is a bottom perspective view showing a housing according to an embodiment.
Figure 4:
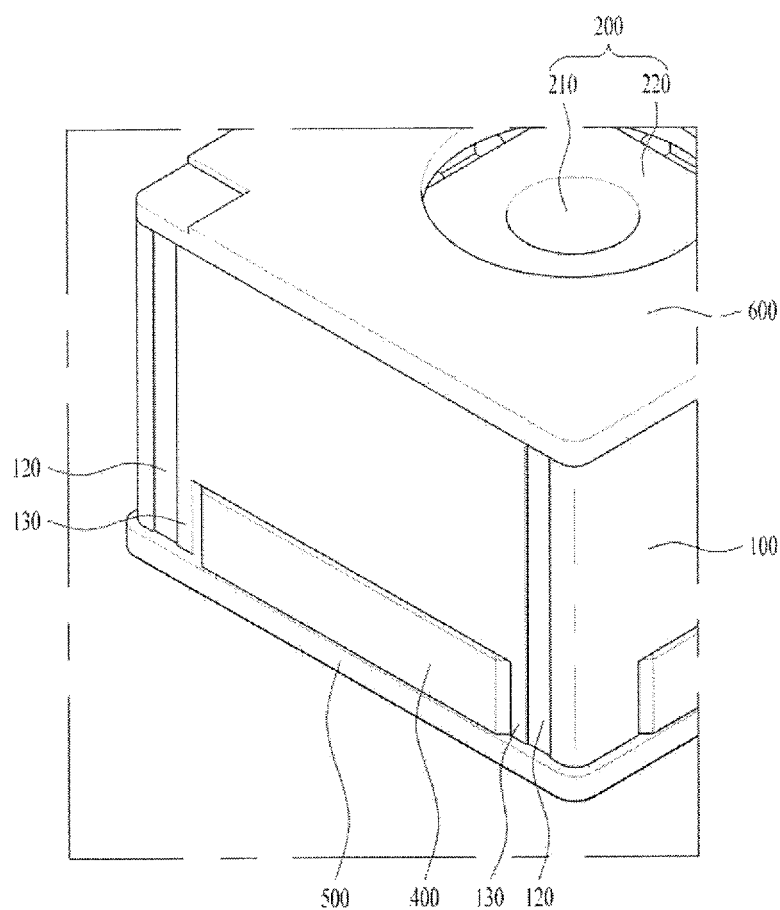
FIG. 4 is a view showing a portion of the camera module according to the embodiment.

FIG. 3 is a bottom perspective view showing a housing 100 according to an embodiment. FIG. 4 is a view showing a portion of the camera module according to the embodiment.

The housing 100 may be provided with first protrusions 130 protruding downward from the lower portion thereof and having ends coupled to the upper surface of the printed circuit board 500. A portion of the second electrode pattern 120 may be formed on the surfaces of the first protrusions 130 such that the first protrusions 130 are coupled to the printed circuit board 500 and the second electrode pattern 120 is coupled or connected to the printed circuit board 500.

As shown in FIG. 4, the second electrode pattern 120, including the protrusions, may be formed at the housing 100 in the upward-downward direction. The second electrode pattern 120 may be formed on the surface of the housing 100.

The electrode pattern may be formed on the surface of the housing 100 using a molded interconnected device (MID) method or a laser direct structuring (LDS) method.

The MID method is a method in which a light-exposed region becomes an electrode line as the physical properties thereof are changed or in which a plated layer is formed in a region having changed physical properties such that an electrode line is formed on the surface of the housing 100. The MID method may be classified into various technology methods.

The LDS method may be a kind of MID method. The LDS method may be performed as follows.

First, a laser may be applied to the housing 100 in order to form an electrode pattern. The housing 100, on which the electrode pattern is to be formed, may be made of a thermoplastic resin material, such as a liquid crystal polymer (LCP) material. The region of the housing 100 to which the laser is applied may be partially melted. The portion of the housing 100 melted by the laser may have sufficient surface roughness for the housing 100 to be plated.

Subsequently, a primary plating operation using a primary metal may be performed on the pattern formed by the laser. For example, nickel or copper, which exhibits high electrical conductivity, may be used as the primary metal in the primary plating operation.

Subsequently, a secondary plating operation using a secondary metal may be performed on the upper surface of the primary metal plated on the pattern. For example, gold, which exhibits high electrical conductivity, corrosion resistance, and chemical resistance, may be used as the secondary metal in the secondary plating operation.

Meanwhile, the primary or secondary metal used in the plating operation is not limited to the above embodiment. Any material that exhibits good electrical conductivity and is suitable for plating may be used.

In an embodiment, as shown in FIG. 4, the second electrode pattern may be formed on the outer surface of the housing 100. The second electrode pattern may be formed from the upper portion of the housing 100 to the lower end of the protrusion, and may be connected to the printed circuit board 500 at the lower end of the protrusion.

In another embodiment, the second electrode pattern may be formed on the inner surface of the housing 100. Referring to FIG. 3, the second electrode pattern may be formed from the upper portion of the housing 100 to the lower end of the protrusion along the surface of the space, in which the lens barrel 300 is received, i.e. the inner surface of the housing 100. In the same manner, the second electrode pattern may be connected to the printed circuit board 500 at the lower end of the protrusion.

Meanwhile, in a further embodiment, although not shown, the auto-focusing unit 200 and the printed circuit board 500 may be connected to each other via a contact pin, in place of the second electrode pattern.

In order to prevent current from not being supplied to the auto-focusing unit 200 due to damage to the contact pin by external impact, the contact pin, auto-focusing unit 200, and the printed circuit board 500 may be integrally formed by insert injection molding such that the contact pin can withstand the external impact.

Figure 6:
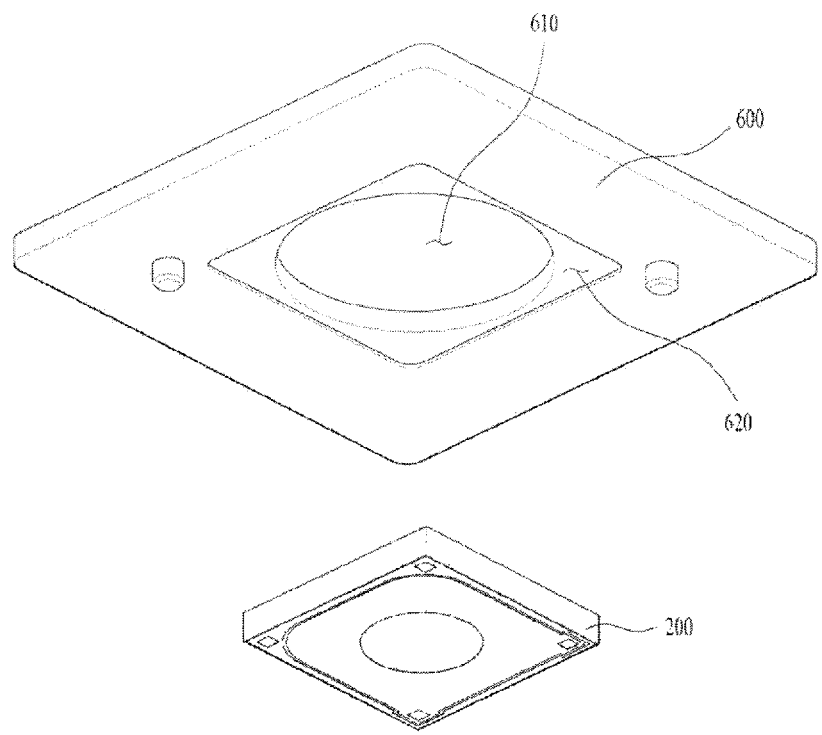
FIG. 6 is a bottom perspective view showing some elements of the camera module according to the embodiment.
Figure 7:
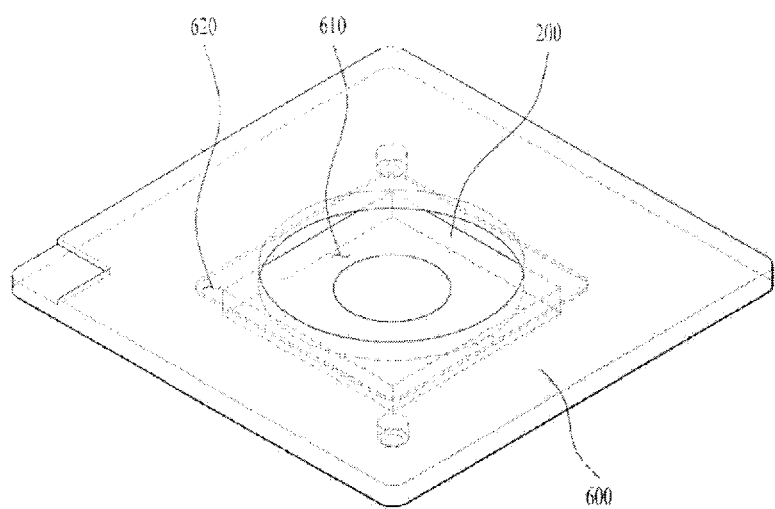
FIG. 7 is a view showing some elements of the camera module according to the embodiment.
Figure 8:
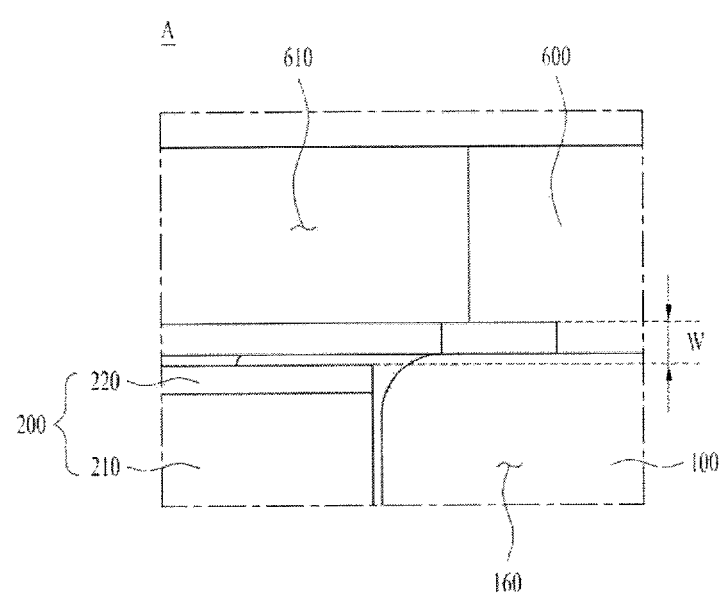
FIG. 8 is an enlarged view showing part A of FIG. 5.

FIG. 5 is a sectional view showing the camera module according to the embodiment. FIG. 6 is a bottom perspective view showing some elements of the camera module according to the embodiment. FIG. 7 is a view showing some elements of the camera module according to the embodiment. FIG. 8 is an enlarged view showing part A of FIG. 5.

The cover member 600 may include a first receiving portion 620. That is, the hollow portion 610 may be formed in the central portion of the cover member 600, and the first receiving portion 620 may be formed in the lower surface of the cover member 600 in a recessed manner. However, there may be no recessed portion.

The first receiving portion 620 may be formed in the edge of the hollow portion 610 in a shape corresponding to the shape of the auto-focusing unit 200. In the embodiment, as shown in FIG. 6, the external shape of the auto-focusing unit 200 may be formed approximately in a thin hexahedral shape.

The first receiving portion 620 may also be recessed in a thin hexahedral shape so as to correspond to the shape of the auto-focusing unit 200 such that the auto-focusing unit 200 is received in the first receiving portion 620.

Meanwhile, the upper surface of the first receiving portion 620 and the upper surface of the auto-focusing unit 200 may be spaced apart from each other. If the upper surface of the auto-focusing unit 200 and the upper surface of the first receiving portion 620 contact each other, the auto-focusing unit 200 may be damaged or deformed.

Particularly, referring to FIG. 7, the auto-focusing unit 200, particularly the corners thereof, may be damaged or deformed by the upper surface of the first receiving portion 620. If the auto-focusing unit 200 is damaged or deformed, the accuracy of auto focusing may be reduced, or the auto-focusing unit 200 may not be operated on account of breakage.

In order to prevent damage to or deformation of the auto-focusing unit 200 for the above reason, the upper surface of the first receiving portion 620 and the upper surface of the auto-focusing unit 200 may be spaced apart from each other.

Referring to FIG. 8, the distance w between the upper surface of the first receiving portion 620 and the upper surface of the auto-focusing unit 200 may be 10 µm to 70 µm. More appropriately, the distance w may be 20 µm to 50 µm.

In an embodiment, as shown in FIG. 8, the adjustment unit 220 is shown as being disposed at the upper side of the lens unit 210. In another embodiment, the adjustment unit 220 is disposed at the lower side of the lens unit 210, in which case the above numerical range may apply equally.

Meanwhile, in order to prevent damage to or deformation of the auto-focusing unit 200 due to contact between the side surface of the first receiving portion 620 and the side surface of the auto-focusing unit 200, the side surface of the first receiving portion 620 and the side surface of the auto-focusing unit 200 may be spaced apart from each other. In addition, the size of the first recess 140 may be equal to or greater than the size of the auto-focusing unit 200.

Meanwhile, as shown in FIG. 5, for example, the image sensor 510 may be mounted on the upper surface of the printed circuit board 500, and the filter 700 may be mounted on the lower side of the first holder 400. The image sensor 510 and the filter 700 may be opposite each other in the first direction while being spaced apart from each other in the first direction.

Figure 9:
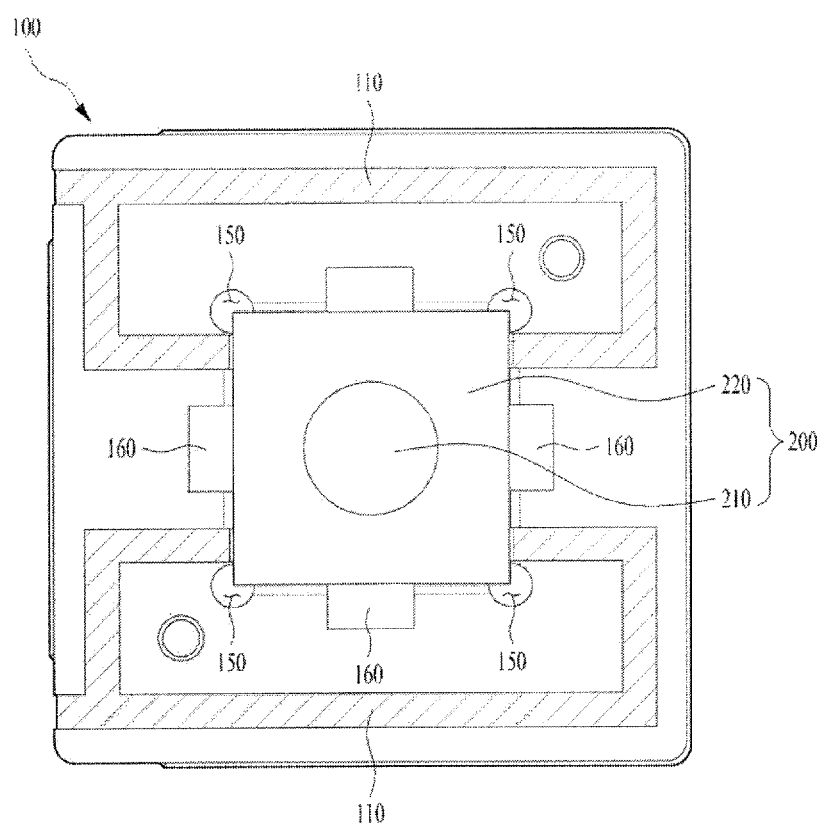
FIG. 9 is a plan view showing some elements of the camera module according to the embodiment.
Figure 10:
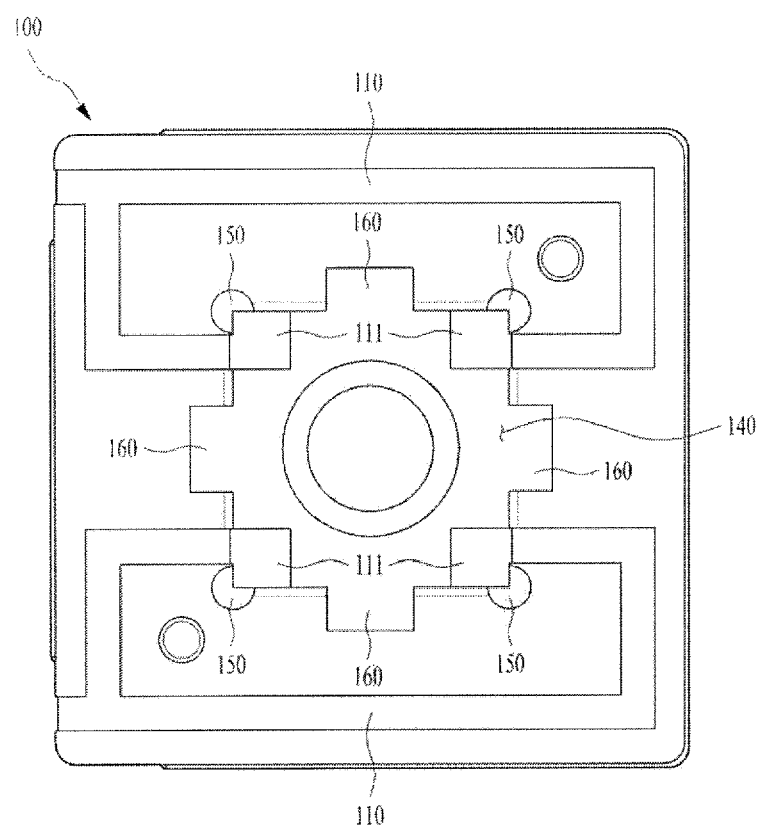
FIG. 10 is a view showing the camera module according to the embodiment, from which the elements shown in FIG. 9 are removed.
Figure 11:
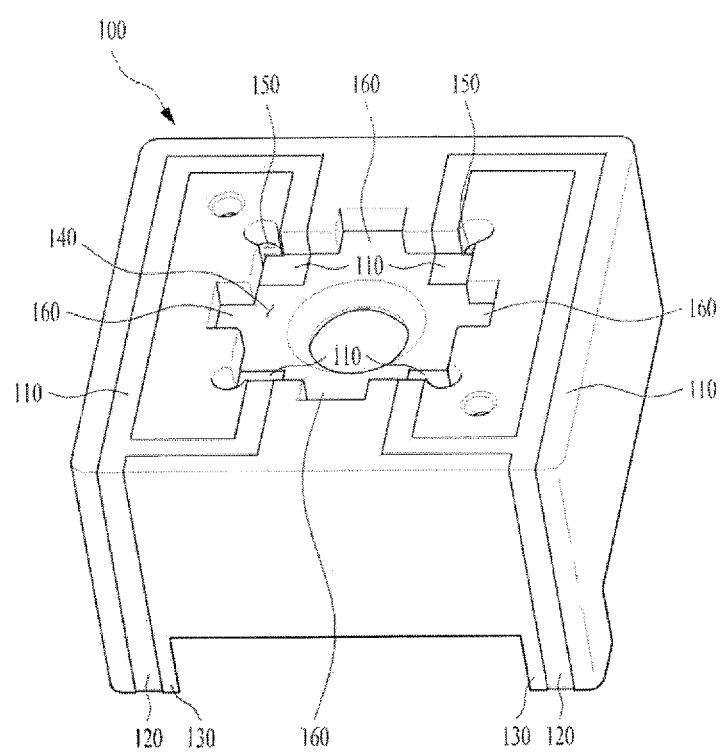
FIG. 11 is a perspective view showing the housing according to the embodiment.

FIG. 9 is a plan view showing some elements of the camera module according to the embodiment. FIG. 10 is a view showing the camera module according to the embodiment, from which the elements shown in FIG. 9 are removed. FIG. 11 is a perspective view showing the housing 100 according to the embodiment.

The first electrode pattern 110 may be formed on the upper surface of the housing 100. As described above, the first electrode pattern 110 may be connected to the second electrode pattern 120, which is formed on the edge of the housing 100.

In the same manner as the second electrode pattern 120, the first electrode pattern 110 may be formed using the MID method or the LDS method. The second electrode pattern 120 may be formed in various shapes and in various numbers considering the number of terminals required by the auto-focusing unit 200 and the shape of the housing 100.

The housing 100 may be provided in the upper surface thereof with a first recess 140, in which the auto-focusing unit 200 is mounted. Referring to FIGS. 9 and 11, the first recess 140 may be formed in a shape corresponding to the shape of the auto-focusing unit 200.

As described above, in the embodiment, the external shape of the auto-focusing unit 200 may be formed approximately in a thin hexahedral shape. The first recess 140 may also be recessed in a thin hexahedral shape so as to correspond to the shape of the auto-focusing unit 200 such that the auto-focusing unit 200 is received in the first recess 140.

Of course, the auto-focusing unit 200 may be formed in various shapes, such as a circular shape and a polygonal shape, when viewed in the first direction, in addition to the thin hexahedral shape. The first recess 140 may also be formed in various shapes corresponding to those of the auto-focusing unit 200.

The auto-focusing unit 200 may be fixed to the first recess 140 using an adhesive. When the auto-focusing unit 200 shakes, the quality of images that are taken may be deteriorated. For this reason, the auto-focusing unit 200 may be fixed to the first recess 140.

Meanwhile, a pad unit 111 may be formed at the first recess 140. The pad unit 111 may be formed on the bottom surface of the first recess 140, may form the end of the first electrode pattern 110, and may be connected to the auto-focusing unit 200.

That is, the pad unit 111 may constitute a portion of the first electrode pattern 110. In the same manner as the first electrode pattern 110 and the second electrode pattern 120, the pad unit 111 may be formed using the MID method or the LDS method.

The pad unit 111 may be connected to a power input terminal of the auto-focusing unit 200. For example, the pad unit 111 may be connected to the auto-focusing unit 200 by soldering or using an electrically conductive adhesive. For example, silver (Ag) epoxy or electrically conductive epoxy may be used as the electrically conductive adhesive.

The housing 110 may be provided in the upper surface thereof with a second recess or a third recess. As shown in FIGS. 9 to 11, in the embodiment, the first recess 140 may be quadrangular when viewed in the first direction, and a second recess 150, which communicates with the first recess 140, may be formed at the corner thereof.

An adhesive may be injected or a soldering operation may be performed through the second recess 150. Particularly, in the embodiment, the second recess 150 is formed so as to be adjacent to the pad unit 111. Consequently, an electrically conductive adhesive may be injected through the second recess 150 such that the pad unit 111 is connected to the auto-focusing unit 200.

In addition, the soldering operation may be performed through the second recess 150 such that the pad unit 111 is connected to the auto-focusing unit 200.

At least two pad units 111 may be provided to supply current to the auto-focusing unit 200. In the embodiment, as shown in FIGS. 10 and 11, the auto-focusing unit 200 may include four external connection terminals, each pair of which has the same polarity. Consequently, two connection terminals having the same polarity may be connected to the first electrode pattern via two pads 111, and the first electrode pattern may be connected to the second electrode pattern.

In another embodiment, two pad units 111 may be provided in the case in which the auto-focusing unit 200 includes two external connection terminals having different polarities.

Meanwhile, in the embodiment, the second electrode pattern 120 is formed at the edge of the side surface of the housing 100. However, the disclosure is not limited thereto. That is, in another embodiment, at least a portion of the second electrode pattern 120 may be disposed adjacent to the central portion of the side surface of the housing 100.

Meanwhile, in the embodiment, as shown in FIGS. 9 to 11, the first recess 140 may be provided in each side thereof with a third recess 160, which communicates with the first recess 140. An adhesive may be injected through the third recess 160 to couple the auto-focusing unit 200 to the recess.

The third recess 160 may be more useful at the time of performing a bonding operation of coupling the lower surface of the auto-focusing unit 200 to the bottom surface of the first recess 140.

In the embodiment, the electrode pattern is formed on the housing 100 in order to connect the auto-focusing unit 200 to the printed circuit board 500, and no additional part for electric conduction is used, whereby the structure of the camera module may be simplified and the number of parts of the camera module may be reduced.

In addition, since no additional part for electric conduction is used, a greater number of steps of the process of assembling the camera module may be performed through automation.

In addition, since no additional part for electric conduction is used, the camera module may have a solid structure. When impact tests are performed on the camera module, therefore, it is possible to reduce the faulty operation rate of the camera module due to damage to the camera module.

Although only a few embodiments have been described above, various other embodiments may be configured. The technical features of the embodiments described above may be combined into various forms unless the technical features are incompatible with each other, in which case it is possible to configure new embodiments.

INDUSTRIAL APPLICABILITY

In embodiments, the electrode pattern is formed on the housing in order to connect the auto-focusing unit to the printed circuit board. Since no additional part for electric conduction is used, it is possible to simplify the structure of the camera module and to reduce the number of parts of the camera module. Consequently, the embodiments have industrial applicability.

The invention claimed is:

1. A camera module comprising:
    a housing having a first electrode pattern faulted on an upper surface thereof and a first recess formed in the upper surface thereof;
    an auto-focusing unit mounted in the first recess and connected to the first electrode pattern;
    a lens barrel received in the housing;
    a first holder disposed at a lower portion of the housing, the lens barrel being coupled to the first holder; and
    a printed circuit board disposed at a lower portion of the first holder and connected to the housing,
    wherein a second recess communicating with the first recess is formed in the housing; and
    wherein the housing is provided with a first protrusion protruding downward from the lower portion of the housing and having an end coupled to an upper surface of the printed circuit board, the first protrusion being formed at a corner of the housing; and the first holder is provided, at a corner thereof opposite the corner of the housing, with a first avoidance portion that inhibits interference with the first protrusion.

2. The camera module according to claim 1, wherein the housing is provided, on at least one selected from an outer surface of the housing and an inner surface of the housing, with a second electrode pattern for connecting the first electrode pattern to the printed circuit board.

3. The camera module according to claim 2, wherein a portion of the second electrode pattern is formed on a surface of the first protrusion.

4. The camera module according to claim 3, wherein the second electrode pattern comprises a plurality of second electrode patterns, and the first protrusion comprises a plurality of first protrusions in a same number as a number of second electrode patterns.

5. The camera module according to claim 1, wherein the first avoidance portion is formed by chamfering the corner of the first holder opposite the corner of the housing.

6. The camera module according to claim 2, wherein the first electrode pattern or the second electrode pattern is formed on the housing by a molded interconnected device (MID) method or a laser direct structuring (LDS) method.

7. The camera module according to claim 1, wherein the auto-focusing unit comprises:
    a lens unit formed of a flexible film having therein a transparent fluid; and
    a film-shaped adjustment unit made of a piezo material.

8. The camera module according to claim 7, wherein the adjustment unit is disposed at at least one selected from an upper side of the lens unit and a lower side of the lens unit to deform a shape of the lens unit such that the lens unit performs auto focusing.

9. The camera module according to claim 1, wherein the first recess has a pad unit disposed at a bottom surface thereof, the pad unit forming an end of the first electrode pattern and being connected to the auto-focusing unit.

10. The camera module according to claim 1, wherein the first recess is quadrangular when viewed in a first direction and is provided in a corner thereof with the second recess.

11. The camera module according to claim 1, wherein the first recess is quadrangular when viewed in a first direction, and the first recess is provided in each side thereof with a third recess, which communicates with the first recess.

* * * * *